United States Patent [19]

Wueller

[11] Patent Number: 5,040,426
[45] Date of Patent: Aug. 20, 1991

[54] DRIVE MECHANISM FOR MOVING A MEMBER ALONG A DEFINED PATH

[75] Inventor: Guenter Wueller, Aachen, Fed. Rep. of Germany

[73] Assignee: Schumag AG, Aachen, Fed. Rep. of Germany

[21] Appl. No.: 444,621

[22] Filed: Nov. 29, 1989

[30] Foreign Application Priority Data

Nov. 30, 1988 [EP] European Pat. Off. ........ 88119950.9

[51] Int. Cl.⁵ ...................... F16H 25/10; F16H 53/06
[52] U.S. Cl. ........................................... 74/56; 74/58; 74/569; 123/90.5
[58] Field of Search ............. 74/567, 569, 56, 57, 74/58; 123/90.48–90.6

[56] References Cited

U.S. PATENT DOCUMENTS

| | | | |
|---|---|---|---|
| 1,000,722 | 8/1911 | Danver | 123/90.48 |
| 1,339,276 | 5/1920 | Murphy | 74/56 |
| 1,345,943 | 7/1920 | McCain | 123/90.5 |
| 2,440,674 | 5/1948 | Bell | 74/58 |
| 2,856,781 | 10/1958 | Forbes | 74/56 |
| 2,959,967 | 11/1960 | Metzner | 74/569 |
| 3,089,472 | 5/1963 | Thompson | 123/90.5 |
| 3,139,076 | 6/1964 | Flaherty | 74/569 |
| 3,374,684 | 3/1968 | Greven | 74/56 |
| 3,628,514 | 12/1971 | Phillips | 74/569 |
| 4,089,234 | 5/1978 | Henson et al. | 74/569 |
| 4,113,327 | 9/1978 | Koch | 74/569 |
| 4,231,267 | 11/1980 | Van Slooten | 74/569 |
| 4,432,310 | 2/1984 | Waller | 74/56 X |

FOREIGN PATENT DOCUMENTS 1028067 4/1958 Fed. Rep. of Germany .
1958118 4/1967 Fed. Rep. of Germany .
2322279 5/1974 Fed. Rep. of Germany .

Primary Examiner—Leslie A. Braun
Assistant Examiner—Winnie Yip
Attorney, Agent, or Firm—W. G. Fasse; D. H. Kane, Jr.

[57] ABSTRACT

A drive mechanism for converting a rotational drive motion into a linear back and forth motion comprising driven member (21) for performing said back and forth motion, and a rotational drive member (33) for applying a driving force to the driven member. The drive member has a cam track (40, 43) cooperating with a cam follower (34, 35) of the driven member. The cam track has straight sections and motion direction reversing zones (41, 42) interconnecting the straight sections to provide an uninterrupted cam track. The cam track straight sections have back-tapered cam surfaces arranged in such a manner that the cam follower does not engage the respective cam surface which faces in a direction opposite to an instantaneous linear motion direction of the driven member, whereby the cam follower engages only cam surfaces facing in the instantaneous motion direction, except in said motion direction reversing zones.

17 Claims, 4 Drawing Sheets

DRIVE MECHANISM FOR MOVING A MEMBER ALONG A DEFINED PATH

FIELD OF THE INVENTION

The invention relates to a drive mechanism for moving a member such as a drawing slide in a drawing machine, along a defined path. Such a drawing mechanism has a closed or endless curve or cam track supported by a cam carrier. The cam or curve entrains mechanically members that are to be moved back and forth or along the defined path. These members cooperate with entraining elements such as rollers or cylinders which engage the cam track or curve surfaces for cooperation with the cam track or curve surfaces.

BACKGROUND INFORMATION

Drive mechanisms of the above mentioned type are, for example, described in U.S. Pat. No. 1,339,276. Such drives have been well tried and found to be satisfactory so that they are widely used. Such drives are also used, for example, in so-called straight drawing machines for producing the drawing slide motion. This type of application of the known drives is described in U.S. Pat. No. 3,374,684 (Greven), corresponding to German Utility Model (DE-GM) 1,958,118 and in German Patent (DE-PS) 1,028,067, as well as German Patent 2,322,279. There is room for improvement, however, particularly in connection with the application of such drives for operating the drawing slide in such straight drawing machines. The drive mechanism in such machines must move relatively large masses so that respectively large forces occur, not only during the forward stroke on the one hand, but also during the return stroke, because a rapid return stroke calls for a respectively high slide acceleration. These forces must be transferred by the entraining elements which, as a rule, are entraining rollers engaging the cam or curve surfaces of the driving member. The width of the driving curve or cam track and the roller spacing must be such that the rollers always engage or contact the cam track surface. Without such engagement or contact unacceptably large impacts may occur due to any play that may be present. As a result of such play, the drawing slide may not be entrained anymore until there is again engagement or contact between the respective cam surface and the corresponding entraining roller. The re-establishment of the contact causes the impact because the roller does not move with the respective speed in the respective motion direction of the slide. In order to prevent such impact it may be possible to construct the rollers, or rather their mounting in a position adjustable manner so that the roller position can be adjusted for assuring the desired engagement between the respective cam surfaces. Once cam surface engagement by the roller is established, the roller is fixed in its position. However, such a structure would make it necessary to make the width of the curve along its entire length with an almost infinite precision. Without such infinite precision even a small tolerance in the curve or cam track width could result in the destruction of the roller mounting at any point along the length of the curvature or cam track that does not satisfy the required precision.

In order to avoid such high precision requirements it is known to mount one of two cam follower rollers in a rigid position while the other cam follower roller of the pair is mounted on a spring biased tilting arm which presses the other roller against the respective cam track surface. Thus, it is possible that dimensional tolerances in the cam track can be compensated by the spring biased cam follower roller. Of the two rollers the rigidly mounted roller is one that causes the drawing stroke of the drawing slide. Specifically, this drawing roller is rigidly mounted on the drawing slide to take up the required drawing forces. The other spring biased roller is the one that causes the return stroke of the drawing slide. However, the return stroke is started with a very large acceleration so that the return stroke cam follower roller must also transmit large forces. As a result, the biasing spring of the return stroke cam follower roller must also be dimensioned to be capable to take up these return stroke forces. Such dimensioning of the biasing spring has the undesired consequence that the rollers are always pressed against the respective cam track surface with the correspondingly large forces, whereby these cam follower rollers are exposed to an increased wear and tear which also applies to the roller bearings and to the cam track surfaces. These biasing springs are constructed to be adjustable and if the springs are adjusted to be too soft, unpermissible impacts do occur at the return points or direction reversing points. This is so because the biasing spring that is adjusted to be too soft cannot take up the occurring acceleration forces and hence yields. Such yielding frequently leads to a rapid destruction of machine parts. Such destructions are highly undesirable from a practical point of view so that the biasing spring is preferably adjusted too hard rather than too soft. Thus, it can occur that the biasing spring is compressed into a block so that no spring biasing is possible anymore. In such instances a rapid destruction is also the result because of the above mentioned unavoidable dimensional tolerances in the cam track. Another disadvantage of the spring mounting of the cam follower rollers for the return stroke is seen in that it requires a substantial structural effort and expense.

OBJECTS OF THE INVENTION

In view of the foregoing it is the aim of the invention to achieve the following objects singly or in combination:

to construct an apparatus of the type described above which is less prone to wear and tear and which nevertheless does not require a high precision construction of the above mentioned cam track so that the apparatus according to the invention can be constructed with less structural effort and expense;

to construct the present drive mechanism in such a manner that it is easily assembled and mounted to facilitate maintenance work;

to make sure that of a pair of cam follower rollers only that one is in contact with the cam track which at the moment performs the cam follower work;

to avoid the above mentioned spring mounting of one of the rollers and the corresponding spring adjustment means; and to avoid the above mentioned impacts at the point where the movement direction is reversed.

SUMMARY OF THE INVENTION

According to the invention the above objects have been achieved in that the cam track surface which faces away from the respective direction of movement of the member to be moved, has a back taper to such an extent that the respective cam follower which is fixed in its position does not contact the cam track surface in this back taper zone, except for a small overlapping area in the vicinity of the cam track reversing point.

Due to the back taper in the cam track surface only that cam follower is in contact with the curve of the cam track surface which at the moment is performing the required work. The other cam follower which at the respective moment does not perform any work, is free, in other words, it does not contact the cam track surface. This construction according to the invention obviates the heretofore required contact force between the cam follower and the respective curve surface of the cam track. Such contact force was required heretofore, especially in connection with drawing slides of straight drawing machines which required rather substantial contact forces. As a result, the invention avoids the respective wear and tear. Another advantage of the present teaching is seen in that the precision requirements to be met by the curvature dimensions of the cam tracks are now rather small. A constrained movement is respectively large and destructively effective forces between the cam followers and the cam track caused by faulty curvature dimensions can no longer occur where the present teaching is applied. This is so because only one cam follower engages the curved cam track surface along a substantial portion of the length of the cam track surface curve. As a result, it is now also possible to mount both cam followers in a rigid position or to maintain both cam followers in a position that has been fixed after an adjustment. A spring biased tilting or swinging arm for a cam follower has been obviated. As a result, the respective structural effort and expense and the danger of a faulty adjustment have also been avoided.

The back tapered portion of the cam track curve merges in a very small overlapping zone into the normal curvature of the working range of the cam track surface on one side of the cam track carrier, while on the other side the working range of the curve merges into the back tapered portion. In this small transition or overlapping range, both cam followers contact the cam track curvature surface simultaneously for a short period of time so that the member to be moved, for example a drawing slide of a straight drawing machine, can be stopped without any jerking and without any impacts so that a smooth reversal of the motion direction is accomplished.

The teaching of the invention may be embodied in various ways. According to one embodiment the curved cam track may be constructed as a ridge that moves between the cam followers or between the rollers forming the cam followers. In another important embodiment the curved cam track surface may be formed by a groove or channel that reaches around the cam follower or cam follower rollers from the outside.

The special construction of the cam followers makes it possible to adjust and fix these cam followers easily so that they will always properly contact the respective cam track surface during their respective work cycle, even during the passing through the transition range so that any play that could cause impacts is avoided. At least one of the cam followers could be so constructed that it bears against a rigid hydraulic column. The pipe conduit or host conduit of such a rigid hydraulic system causes a certain elasticity in spite of the basic rigidity of such a hydraulic column. However, such elasticity is within very narrow limits so that inaccuracies of the curvature of the cam track in the small transition zone can be taken up or compensated. As a result, it is not critical to make the transition zone as small as possible. Actually, the present construction can tolerate a somewhat larger transition zone.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
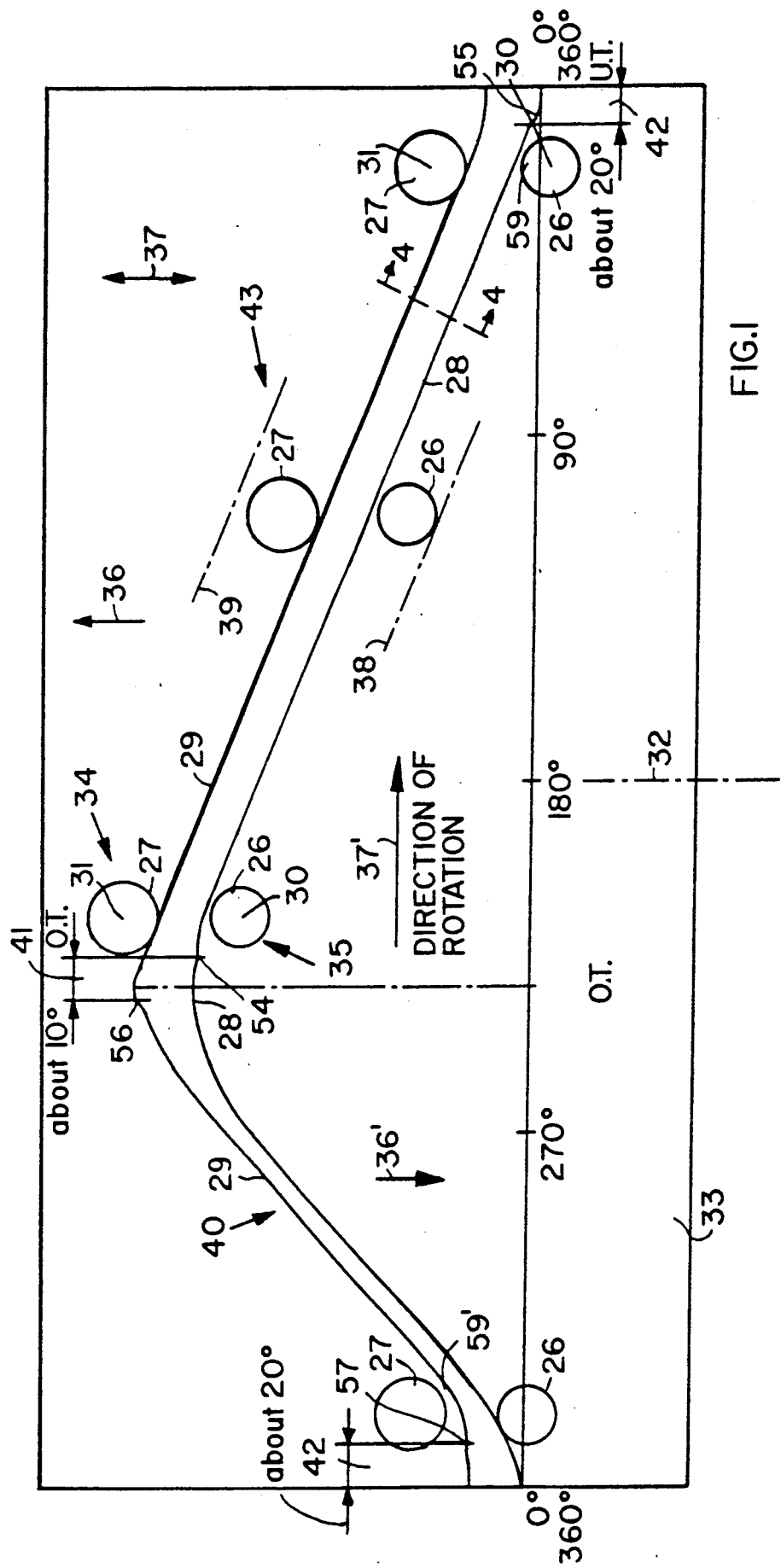
FIG. 1 illustrates a projection of the curve of a cam track carrier also shown in its projection into the drawing plane.

FIG. 1 illustrates the projected surface of a cam carrier drum or cylinder 33 carrying a curved cam track 40 which is raised above the surface of the cam carrier drum 33 in the manner of a curved rail. Such a drum or cylinder carrying the cam track 40 is suitable for driving, for example a drawing slide 21 shown in FIGS. 2 and 3 or a component 58 shown in FIG. 4, of a straight drawing machine, or the drawing slides of machines, which cooperate with each other, so that the workpiece being drawn is transferred from one slide to the other. The drum or cylinder 33 is mounted for rotation about an axis 32. A separate curved driving cam track 40 is provided for each slide. Each cam track 40 has its own cam track carrier drum or cylinder 33 and is raised above the surface of the drum or cylinder 33. Each cam track 40 further has two curved guide surfaces 28 and 29 opposite each other as far as the cam track 40 is raised above the surface of the cam carrier drum or cylinder 33. Alongside each cam track raised surface 28, 29 there is a respective groove milled into the surface of the cam track carrier 33. A groove side wall 38 indicated by a dash-dotted line runs in parallel to the cam track raised surface 28. A groove side wall 39 indicated by a dash-dotted line runs in parallel to the raised cam track curved surface 29. Thus, the track groove surface 38 is below and opposite the surface 28 while the groove side wall 39 is below and opposite the surface 29.

Two cam follower means 34 and 35 in the form of cam follower rollers 27 and 26 respectively, are arranged for cooperation with the cam track 40. These cam followers 34 and 35 are rigidly mounted to a component to be moved back and forth, for example, the above mentioned drawing slide 21. Such a drawing slide is shown at 21 in FIGS. 2 and 3. The drawing slide 21 is moved back and forth in the direction of the double arrow 37 shown in FIG. 1. The cam follower rollers 26 and 27 are arranged one behind the other or in a row as viewed in the direction indicated by the arrow 37. The cam track carrier cylinder or drum 33 is rotated in the direction of the arrow 37'. FIG. 1 shows the cam follower rollers 26, 27 in four different positions relative to the rotational position of the cam carrier drive drum or cylinder 33. These different positions of the cam follower rollers 26 and 27 correlate directly to respective angular positions of the cam track curves 40 and 43. The cam track 43 is formed by the grooves 38 and 39. If the cylinder 33 rotates about rotation axis 32 in the direction of the arrow 37', the follower rollers 26, 27 will move from right to left in FIG. 1 relative to the drive cylinder 33. However, together with the driven slide 21 the rollers 26, 27 with their cam follower devices 35 and 34, respectively, will move up and down in the direction of the arrow 37. In the course of this movement, the cam follower rollers 26, 27 pass, so to speak, through 360° along the surface of the drive drum or cylinder 33. This type of motion conversion is known as such so that there is no need for a detailed description, see for example U.S. Pat. No. 3,374,684 (Greven).

For the example shown in FIG. 1 it shall be assumed that the roller 27 shall be the roller which needs to transmit a larger force than the roller 26. This situation is, for example, present for the pulling stroke as compared to the return stroke of a drawing slide 21. Accordingly, the roller 26 transmits the force sufficient for the return stroke. Preferably, the roller 27 is rigidly mounted to the component to be moved such as the slide 21. The roller 26 for transmitting the smaller force required for the return stroke can accordingly be somewhat smaller and its strength needs to be just sufficient for the force required for the return stroke. Further, the roller 26 is preferably mounted adjustable in its position in the direction 37. For this purpose the roller 26 is mounted in a position adjustable fork-type roller head 9 on a roller shaft 44 so that the roller 26 is rotatable about the roller axis 30. Suitable anti-friction bearings 45 are used for mounting the roller 26 on the shaft 44 as generally shown in FIGS. 2 and 3.

Figure 2:
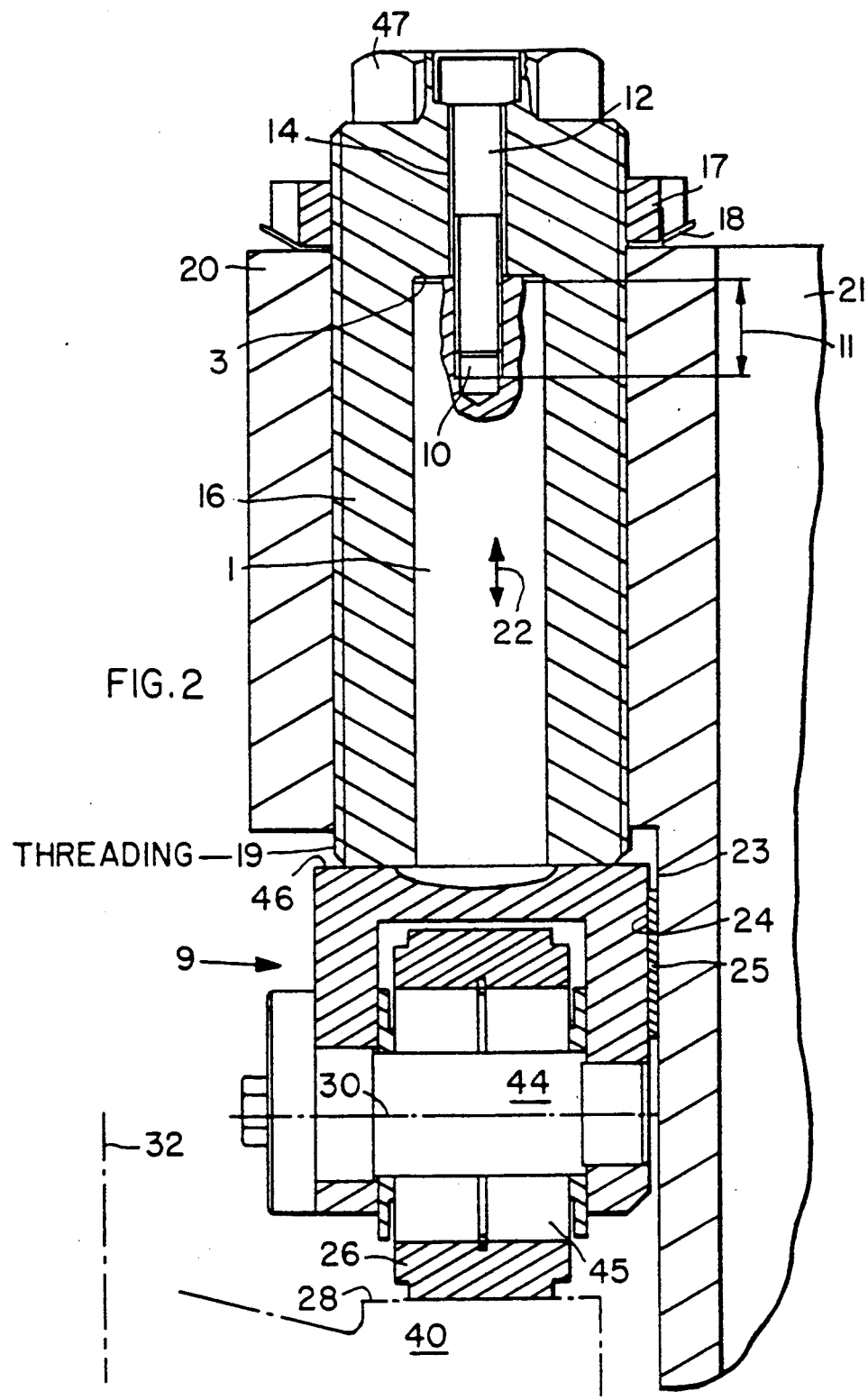
FIG. 2 is a longitudinal section through a cam follower drive member according to the invention.
Figure 3:
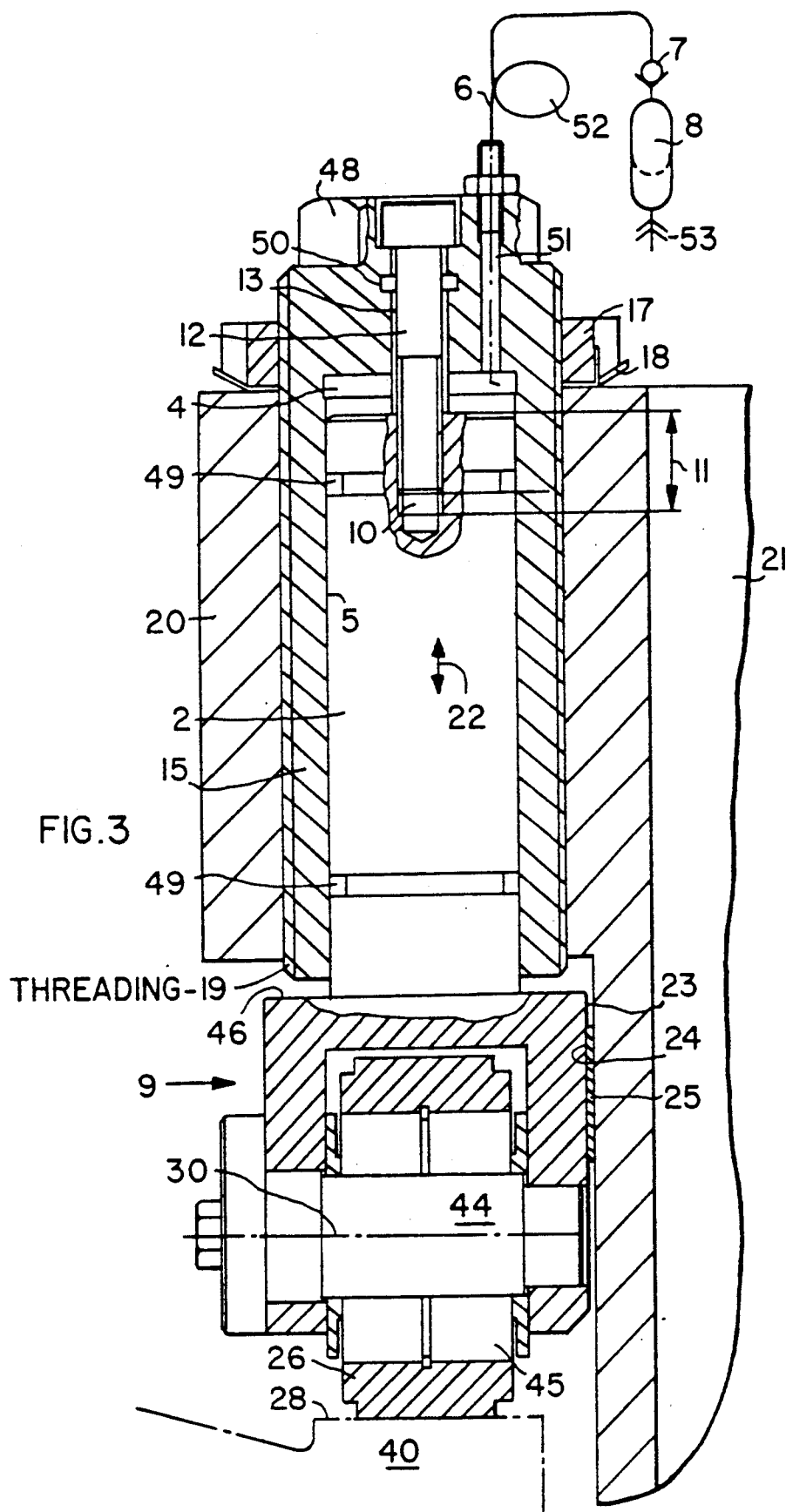
FIG. 3 is a sectional view through a hydraulically supported or mounted cam follower drive member.

Referring to FIG. 2, the rotational axis 30 of the roller head 9 is arranged perpendicularly to the rotational axis 32 of the cam track carrier drum 33. The roller head 9 comprises on its side facing the component 21 to be moved, a flat surface 24 which bears against the also flat counter-surface 23. Counter-surface 23 is part of a shim element 25 secured to the component 21. Alternatively, the surface 23 may be directly part of the component 21 without the intermediary of a shim. The cooperation between the surface 24 and the surface 23 of the roller head 9 makes sure that the roller head 9 cannot rotate about its vertical longitudinal axis. However, a displacement of the roller head 9 in the adjustment direction 22 is possible and thus the movement in the motion direction 37 also remains possible. For this purpose the roller head 9 as shown in FIG. 2 is inserted by means of a shaft 1 to which the roller head 9 is rigidly connected, into a respective bore 3 of an adjustment piece 16. The shaft 1 has an internal threading 10 extending centrally along the length 11 on the side of the shaft 1 facing away from the roller head 9. A head screw 12 engages the internal threading 10, whereby the shank of the screw 12 passes through a respective bore 14 in the adjustment piece 16. With the aid of the screw 12, it is possible to pull the shaft 1 into the bore 3 to such an extent that the roller head 9 with its backside 46 bears against the respective facing side of the adjustment piece 16.

The adjustment piece 16 has on its outside an outer threading 19 which engages a respective threaded nut 20. In the shown example, the threaded nut 20 forms an integral part of the component 21 to be moved. However, such an integral construction of the nut 20 as part of the component 21 to be moved is not absolutely necessary.

As long as the head screw 12 is not tightened too much, it is possible to rotate the adjustment piece 16 inside the inner threading of the threaded nut 20 to thus move the adjustment piece 16 in the adjustment direction 22. For this purpose the adjustment piece 16 has a hex member 47 formed at its free outer end. Thus, the adjustment piece 16 can be operated with a regular hex wrench. The adjustment of the curve or cam track 40 by a respective rotation of the cam track carrier drum 33 may be accomplished in such a way that the cam follower rollers 26 and 27 become located in an overlapping zone 41 shown in FIG. 1 at the tip of the cam track or curve 40. At this point, the adjustment piece 16 is rotated until the roller head 9 with its roller 26 bears securely against the cam track surface 28. If, in this situation the roller 27 does not yet securely bear against its respective cam track surface 29, the adjustment in the direction 22 of the adjustment piece 26 is continued, whereby the slide or component 21 to be moved is also displaced so that the roller 27 comes to bear against the contact surface 29 in the same manner as the roller 26. At this point the correct adjustment has been achieved and the adjustment can now be fixed. The fixing is accomplished by a counter-nut 17 on the external threading of the adjustment piece 16. The counter-nut 17 is equipped with a safety sheet metal member 18 which is conventional and constructed for preventing the loosening of the counter-nut 17. Thus, the counter-nut 17 makes sure that the adjusted position of the cam follower rollers 26 and 27 is retained. As a result, these rollers assume a rigid fixed position which is not further adjustable until the counter-nut 17 is intentionally loosened again. This adjusted fixed position of the rollers 26 and 27 is possible according to the invention without causing any damage due to the special construction of the cam track or the curved surfaces of the cam tracks 40 and 43 as will be described in more detail below with reference to the cam track or curve 40.

In spite of the special construction of the cam track surfaces as taught by the invention it may be desirable to provide a small elasticity of the cam tracks. Such elasticity is achievable by the particular construction of the cam follower 35 illustrated in the example embodiment of FIG. 3. In FIG. 3 the construction of the roller head 9 is substantially the same as in FIG. 2 including the features for preventing a rotation of the roller head 9 about its longitudinal axis. The shaft 2 of the roller head 9 of FIG. 3, however, is constructed as a hydraulic piston. For this purpose a respective cylinder is formed as a bore 4 in the adjustment piece 15 which is essentially constructed as the adjustment piece 16 of FIG. 2. The hydraulic piston shaft 2 is sealed by seals 49 relative to the inner wall 5 of the adjustment piece 15.

Referring further to FIG. 3, the shaft 2 also has an internal threading 10 on the side facing away from roller head 9, said internal threading extending over the length 11. Similar to the arrangement described with reference to FIG. 2, this internal threading 10 holds a head screw 12 which is inserted through a corresponding bore 13 of the adjustment piece 15. In this case though, the unthreaded portion of the shaft of the head screw 12 is sealed against the wall of the bore 13 by a gasket 50.

The head screw 12 pulls in shaft 2 into the bore 4 but only so far that a small gap remains between the backside 46 of the roller head 9 and the corresponding face of adjustment piece 15. This feature also leaves a somewhat larger spacing in bore 4 between its cylinder bore end, not further marked, and the face of shaft 2 facing away from roller head 9. Thus, a small range of motion in the adjusting direction 22 is thereby permitted for shaft 2 which is constructed as a hydraulic piston.

The space remaining between bore 4 and the end of the shaft 2 facing away from roller head 9, is completely filled with hydraulic fluid. To this end, a suitable connection bore 51 for a hydraulic line 6 is provided in the head of the adjustment piece 15. The hydraulic line is fitted with a check valve or non-return valve 7 and connected to a pressure reservoir 8. The valve 7 prevents a back flow from the cylinder space of the bore 4 and assures that the full pressure applied to the reservoir 8 is available to push out the shaft 2 to the extent permitted by head screw 12. When external forces attempt to push the shaft 2 into the bore 4, they are taken up by the hydraulic pressure and thereby transferred instantly to the component 21 which is to be moved.

The adjustment of roller 26 takes place as described with reference to FIG. 2. With the embodiment of FIG. 3, however, short duration dynamic force or impacts as they occur from small irregularities in the dimensions of the cam track 40 can be taken up by the hydraulic system because the always present elasticity of line 6 can serve for this purpose. The degree of elasticity can be influenced by the use of more or less elastic hydraulic hose for line 6 or, in case the usual rigid metal tubes are used, by laying out the line 6 with at least one loop 52 which also provides the required elasticity of the hydraulic system.

Line 6, check valve 7, and pressure reservoir 8 require only small dimensions, are attached to, and move with the moving component 21. An inlet port 53 is provided on pressure reservoir 8 to permit refilling of the hydraulic fluid when necessary. Setting of the adjustment piece 15 through its rotation can again be done with an outer hex head 48. Counter nut 17 and safety sheet metal member 18 secure the adjusted position in the manner described above.

FIG. 1 shows rollers 26 and 27 aligned behind each other in the direction of motion 37. Rollers 26, 27 rotate about parallel axes 30 and 31, which are in turn perpendicular to the rotational axis 32 of the cam track carrier drum 33. The driving curved cam track 40 extends between the outer surfaces of rollers 26 and 27. A conventional cam track heretofore used instead of the present cam track 40 is so dimensioned that its track surfaces are at all times in contact with and never leave the circumferential surfaces of the cam follower rollers 26 and 27 throughout the entire length of a conventional cam track. This, however, creates the drawbacks described above. In the case of the application of such driving cam tracks to conventional straight drawing machines efforts were conventionally made to remedy such drawbacks by supporting the roller for the back stroke of the drawing slide, namely roller 26 in FIG. 3, on a spring biased tilting arm as shown in U.S. Pat. No. 3,374,684 (Greven). However, such tilting arm creates new drawbacks which also were described above.

The dynamics of such a driving curve or cam track 40, however, do not enforce that the curve surfaces 28 and 29 remain in continuous contact with the circumferential surfaces of the cam follower rollers 26 and 27. During the operational cycle of the present drive mechanism there rather is always only one or the other roller necessary to transfer the required force. For example, FIG. 1 shows clearly that only the roller 27 is working during the drawing stroke 36 and must be engaged with the curve surface 29 while the roller 26 is not engaged with the curve portion 28 during the drawing stroke 36.

In case of a recessed groove it would be the roller 26 contacting the surface 38. Roller 26 need not transfer any forces during the drawing stroke 36. It is for this reason that the curve or cam surface 28 has a cut-back or back-taper 59 to provide a disengaged space between the roller 26 and the respective cam surface at points 54 and 55 opposite the region where curve or cam surface 29 operates the drawing stroke 36. This means that in this cut-back region at the disengaged space 59 of the driving curve or cam track 40, cam surface 28 is recessed back from its normal shape, which would otherwise provide continuous contact with the roller 26, so that the roller, adjusted as described in a fixed position, is free and without contact with the cam track. Roller 26 now remains free because there is no spring forcing it back toward the cam track surface 28.

During the back stroke 36', in the direction opposite to the drawing stroke 36, only roller 26 is required to transfer forces. Roller 27 can remain idle. Correspondingly, driving curve or cam track 40 is also cut-back or back-tapered to provide a cut-back to provide a disengaged space in the region between the roller 27 and the respective cam surface at points 56 and 57. Thus, the respective cam surface is recessed behind the normal shape of the cam surface 29. Hence, cam follower roller 27 is free from the corresponding curve surface over this region 59' as is indicated on the left side of FIG. 1.

Aside from the cut-back or back-tapered regions 59 described above and the normal stretches of the cam surfaces 28 and 29 which effect the strokes, driving cam track 40 has two transition regions 41 and 42 where the circumferential surfaces of both rollers 26 and 27 simultaneously contact the cam surfaces 28 and 29 respectively. Load reversal between the drawing stroke and the back stroke occurs in these regions. FIG. 1 shows a motion direction reversing section 41 extending for about 10° around the upper reversal area OT of the cam track 40. Around the lower reversal area UT, where the back stroke is changed into a drawing stroke, a further motion direction reversing section 42 is shown and extends for about 20° of the cam track 40. However, the lower motion direction reversing section 42 could equally extend for 10°. A transition region width of 10° is not mandatory, only advantageous for the motion direction reversing sections 41, 42.

FIG. 1 shows the cam follower rollers 26 and 27 in the vicinity of the upper reversal area OT, in such a way, that the roller 27 is pushed in the direction of the drawing stroke 36 while its circumferential surface is in contact with the cam surface 29 which is moving in the direction 37' of rotation. In contrast, roller 26 is free of any contact with a cam surface. On further rotation of the cam track 40, both rollers approach the motion direction reversing section 41. At point 54 the roller 26 leaves the undercut region and fully contacts the cam surface 28 while the roller 27 is still in contact with the cam surfaces 29. Both cam follower rollers 26 and 27 at this point have full contact with their respective cam surface and therefore prevent any motion of the component 21, except as provided for by the driving cam track 40. The movement of the component 21 is thereby tightly controlled by the shape of driving cam track 40.

The transition region, however, can be rather small, for example, 10° or less as mentioned. It is only necessary that the drawing stroke 36 is fully accomplished and that roller 26 touches the cam surface 28 just prior to the end of the drawing stroke in order to initiate the necessary contact for the back stroke. As soon as the drawing stroke 36 is completely finished and contact of roller 26 with the cam surface 28 is assured, further contact of the circumferential surface of the roller 27 with cam surface 29 is no longer required. Roller 27 at this point has reached point 56 and enters the undercut region of the cam surface 29 of the driving cam track 40, thereby losing contact with the cam surface 29.

In the motion direction reversing section 42 near the lower reversal point UT where the back stroke changes into the drawing stroke, the sequence is reversed. At point 57 the circumferential surface of the roller 27 contacts against the cam surface 29 while roller 26 moves out of contact with the cam surface 28 only after the drawing stroke is initiated at point 55. A transition region of 20° is provided there, but could be made much smaller, if desired.

Precise tolerances for the width of the driving curve cam track 40 are now required only in the motion direction reversing sections 41 and 42 unless use is made of the hydraulic roller support of FIG. 3. These transition regions can be minimized according to the invention. This greatly facilitates the fabrication of the shape of the driving cam tracks 40 or 43. At the same time the construction of the corresponding cam followers 34, 35 is simplified and both followers and cam surfaces of driving cam tracks 40 or 43 are subject to lower forces and hence less wear and tear. Jolts in the zones of motion reversal are reduced and failures due to faulty adjustments are avoided. As a result, higher drawing speeds and a smoother motion of the drawing slide have been achieved. Corresponding features of elements other than the drawing slide equally benefit when driven by such a back-tapered cam track as taught therein.

The high spring load for the back stroke roller, namely roller 26 in the example embodiment after FIG. 1, which was required in the prior art, caused high reaction forces especially shearing forces on the guiding parts of the moving elements leading to correspondingly high wear. These undesirable forces are significantly reduced by the construction in accordance with the invention and hence, wear and tear on the guiding parts is appreciably reduced.

Figure 4:
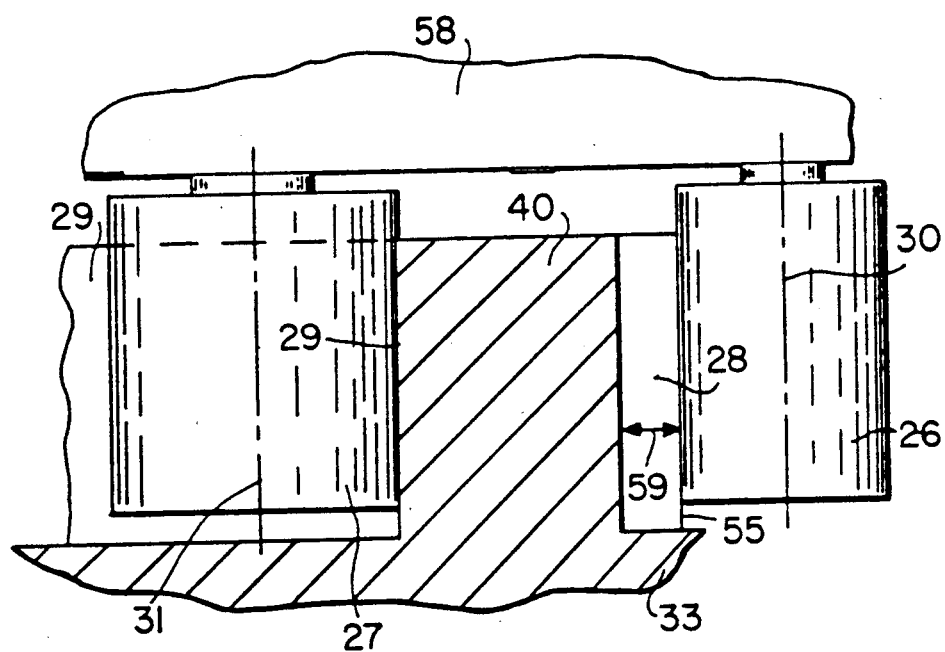
FIG. 4 is a partial sectional view along section line 4—4 in FIG. 1.

FIG. 4 shows a section along section line 4—4 in FIG. 1 to illustrate the back-taper 59 of the cam surface 28. The cam track carrier or drum 33 carries the raised drive cam track 40 as described above. The roller 27 contacts the cam surface 29 of the track 40 as also seen in FIG. 1. However, according to the invention the roller 26 does not contact the same surface 28 in this area due to the cut-back on back-taper 59 of the cam surface 28. The rollers 26, 27 are rotatably secured to the components 58, such as a slide, and are rotatable about their axis 30, 31 respectively. The positions of the roller axis may be adjustable relative to the component 58 and one of the surfaces of the rollers 26, 27 contacts the cam surface 28, 29, the adjusted position is fixed, for example, as described above with reference to FIGS. 2 and 3.

Although the invention has been described with reference to specific example embodiments, it will be appreciated that it is intended to cover all modifications and equivalents within the scope of the appended claims.

What I claim is:

1. A drive mechanism for converting a rotational drive motion into a linear back and forth motion, comprising driven means (21) for performing said back and forth motion, rotational drive means (33) for applying a driving force to said driven means, cam track means (40, 43) as part of said rotational drive means, cam follower means (34, 35) as part of said driven means, said cam track means having straight sections (28, 29) and motion direction reversing sections (41, 42) interconnecting said straight sections to provide an uninterrupted cam track, each of said cam track straight sections (28, 29) having a cut-back cam surface forming a disengaging spacing (59, 59') arranged in such a manner that said cam follower means do not engage the respective cut-back cam surface which faces in a direction opposite to an instantaneous linear motion direction of said driven means, whereby said cam follower means engage only cam surfaces facing in the instantaneous motion direction, except in said motion direction reversing sections (41, 42).

2. The drive mechanism of claim 1, wherein said cam follower means comprise two cam follower rollers (26, 27), wherein said cam track means comprise four cam surfaces (28, 29 or 38, 39) which contact a respective one of said cam follower rollers (26 or 27) in said motion direction reversing sections (41, 42).

3. The drive mechanism of claim 1, wherein said motion direction reversing sections (41, 42) of said cam track means extend for about 10 degrees of one revolution of said rotational drive means.

4. The drive mechanism of claim 1, wherein each of said motion direction reversing sections (41, 42) of said cam track means (40; 43) has a different angular extent relative to one revolution of said rotational drive means.

5. The drive mechanism of claim 1, wherein said cam follower means (34, 35) comprise two cam follower rollers (26, 27) arranged in a row on said driven means (21), said row extending in a direction of said linear back and forth motion (37) of said driven means (21), said cam track means of said rotational drive means comprising a cam track member (40) including two cam track surfaces (28, 29) arranged between said two cam follower rollers (26, 27).

6. The drive mechanism of claim 1, wherein said cam follower means (34, 35) comprise two cam follower rollers (26, 27) arranged in a row on said driven means (21), said row extending in the direction of said linear back and forth motion (37) of said driven means (21), said rotational drive means comprising cam track grooves with cam track groove surfaces (38, 39), said two cam follower rollers (26, 27) being located between said cam track groove surfaces (38, 39).

7. The drive mechanism of claim 6, wherein one cam follower roller (26) of said two cam follower rollers (26, 27) is adjustable and lockable in its position, while the other cam follower roller (27) is mounted in a fixed position.

8. The drive mechanism of claim 7, wherein said driven driven means (21) is a drawing slide of a straight drawing machine, and wherein said fixed position cam follower roller (27) of said two cam follower rollers (26, 27) is the one which is in contact with the respective cam track surface (29, 38) during a drawing stroke (36).

9. The drive mechanism of claim 1, wherein said cam follower means (34, 35) comprise two cam follower rollers (26, 27), each cam follower roller (26, 27) contacting respective cam surfaces (28, 29; 38, 39) of said cam track means, said cam follower means further comprising a mounting head means (9) for mounting said cam follower rollers, said mounting head means having an axis (30, 31) perpendicular to a rotation axis (32) of said rotational drive means (33).

10. The drive mechanism of claim 9, wherein said mounting head means (9) comprise means for adjusting said mounting head means in its position, said mounting head means including a shaft (1, 2) for cooperation with a corresponding bore hole (3, 4) in said adjusting means (15, 16), and means for securing said mounting head means in a fixed position.

11. The drive mechanism of claim 10, further comprising means for securing said adjusting means to said driven means (21).

12. The drive mechanism of claim 11, further comprising means for securing said mounting head means (9) against rotation relative to said driven means (21).

13. The drive mechanism of claim 11, wherein said mounting head means (9) comprises a flat surface (24) parallel to an adjustment direction (22), said flat surface being in gliding contact with a corresponding surface (23) of said driven means (21) or of a piece (25) attached to said driven means (21).

14. The drive mechanism of claim 11, wherein said means for adjusting comprise an adjustment piece (16) with an external threading (19) and a threaded nut (20) for cooperation with said adjustment piece, said threaded nut being arranged on said driven means (21), and means for holding said adjustment piece (16) and nut (20) in an adjusted position.

15. The drive mechanism of claim 14, wherein said means for holding said adjustment piece (16) in said adjusted position comprises a counter nut (17) with a safety washer (18) on said external threading (19) of said adjustment piece (16), said safety washer (18) operating as a counternut.

16. The drive mechanism of claim 10, wherein said mounting head means comprise a shaft (1, 2) having a cylindrical body centered on a side facing away from said mounting head means (9), and a threaded bore (10) of limited length (11) into which a head screw (12) is inserted through a corresponding bore (13, 14) of said adjustment means (15, 16).

17. The drive mechanism of claim 16, wherein said shaft (2) is a piston sealed against a wall (5) of a bore (4), whereby a cylindrical space ahead of said piston is connected to a pressure reservoir (8) by a line (6) and a check valve (7) in said line (6) for preventing any back flow into the pressure reservoir (8).

* * * * *